March 24, 1970  S. CUDLITZ ET AL  3,501,953
BATHYKYMOGRAPH AND METHOD

Filed Sept. 16, 1966  2 Sheets-Sheet 1

INVENTORS
*Stephen Cudlitz*
*William W. Robblee*
BY *Larsen & Santa*
ATTORNEYS

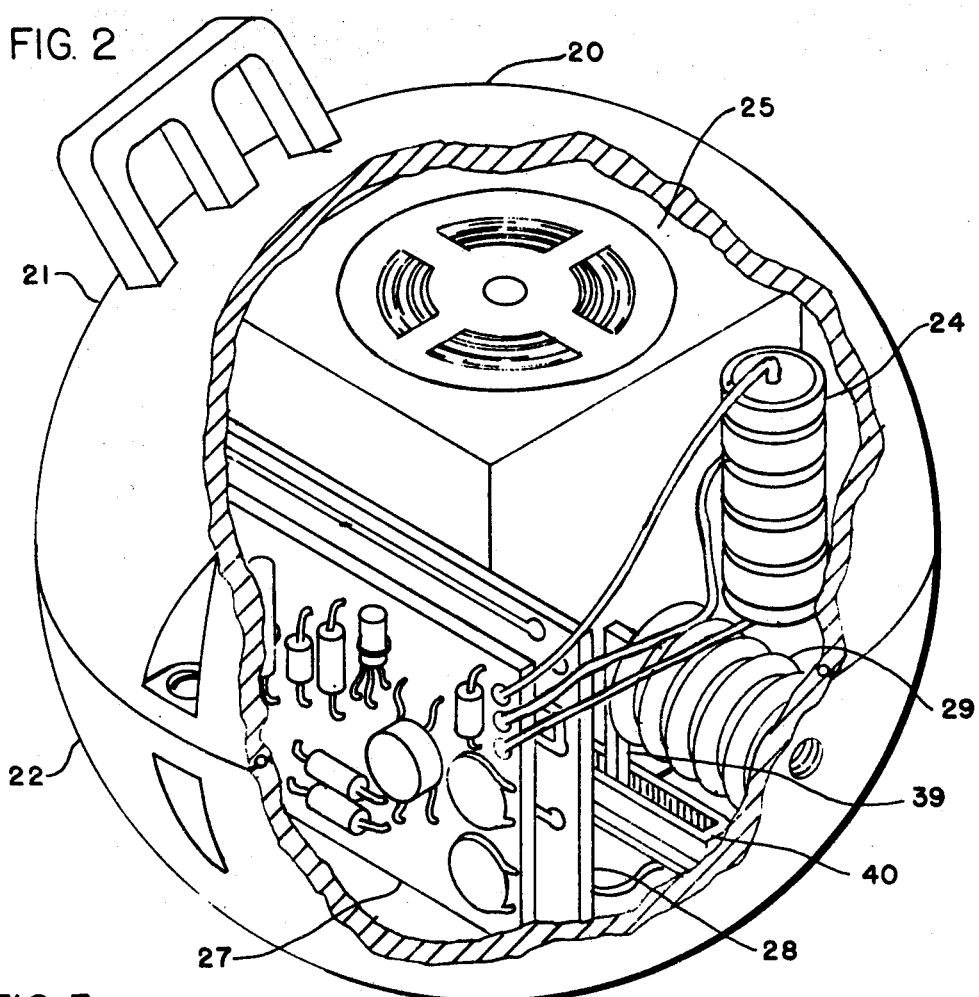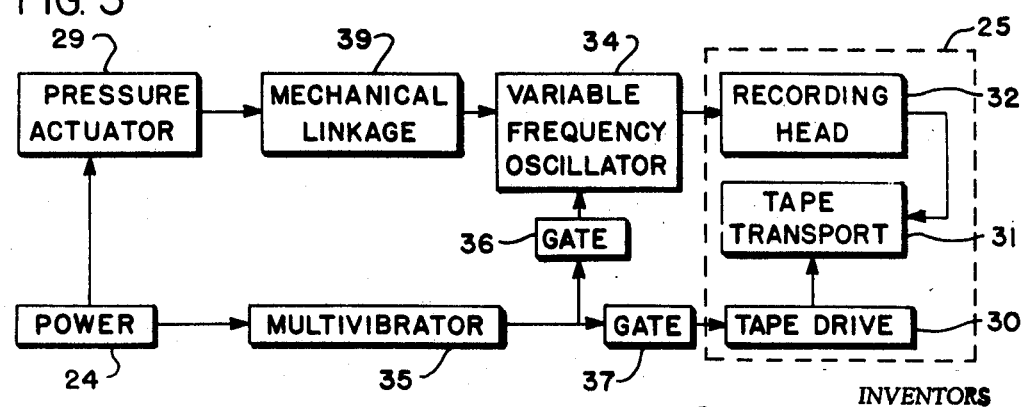

3,501,953
BATHYKYMOGRAPH AND METHOD
Stephen Cudlitz, Marblehead, and William W. Robblee, Randolph, Mass., assignors to KSC Semiconductor Corporation, Chelmsford, Mass., a corporation of Massachusetts
Filed Sept. 16, 1966, Ser. No. 579,992
Int. Cl. G01f 23/14
U.S. Cl. 73—170
3 Claims

ABSTRACT OF THE DISCLOSURE

A system of ocean mapping is disclosed whereby the normal operations of fishermen drawing otter-trawl nets are utilised to collect data. A self-contained recording pressure instrument is adapted to be attached to the net headrope and handled as any other head-rope float. The instrument provides, upon return to port, a record of depth-versus-time which is correlated with position-versus-time records for the trawler obtained by other means, and compared with records from other boats to provide ever-improving bottom contour maps.

---

This invention relates to fishing and to oceanography. More particularly it relates to a method and apparatus for accumulating useful oceanographic information as a by product of commercial fishing operations.

This is desirable for the development of commercial fisheries, for the study of ocean currents, and for the improvement of navigation to develop accurate charts of the oceans, and particularly of the continental shelf and the marginal seas. Fishermen draw nets in these waters. It is an object of the present invention to provide methods and means to make use of the normal activity of fishermen so engaged to collect information on such parameters as ocean depth, salinity, temperature, and earth's magnetic field. It is another object of the invention that the collection of this data should not interfere with the normal activities of the fishermen. It is a further object of the invention that the reporting of this data should also not interfere with the normal routing of the fishing vessel or require any special training by its crew. It is a further object of the invention that the data be collected so that the reduction and interpretation of the data may be to the largest possible degree be effected by automatic electronic computing machinery.

The above objects are achieved by providing a data-logging instrument called a bathykymograph that is physically interchangeable with the standard head-rope float spheres which fishermen use to buoy the head of a trawl net a predetermined distance above the bottom, and by incorporating in the bathykymograph a magnetic-tape recorder which is periodically activated to record in digital form successive points of data; and which will operate unattended for a period of about two weeks.

Other objects and features of the invention will in part be obvious and will in part appear hereinafter. The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 2 is a cut-away view of the bathykymograph of the invention showing the general arrangement of parts, FIG. 3 is a block diagram of the bathykymograph.

Figure 1:
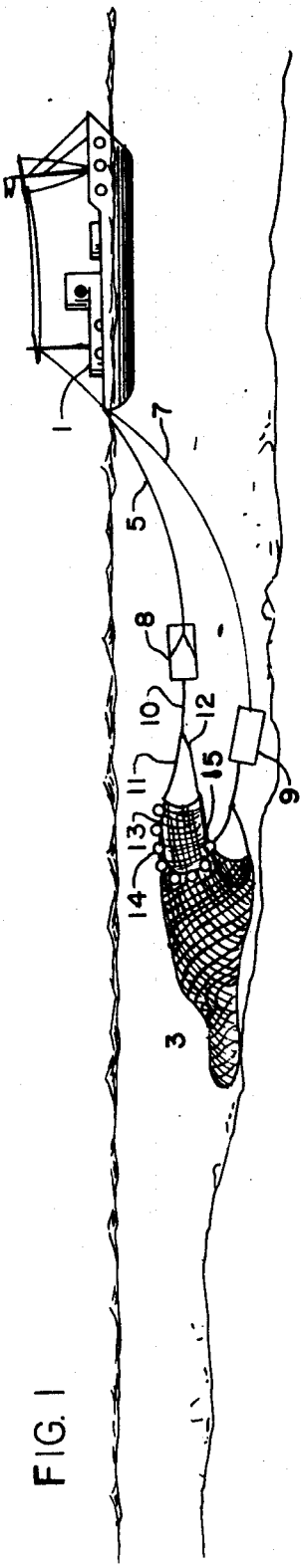
FIG. 1 is a sketch showing the arrangement of trawler, net, otter doors, and tackle.

FIG. 1 shows the general arrangement of a trawler 1 and its net 3. The trawler tows by warp wires 5 and 7 connected to otter doors 8 and 9 at either side of the net.

The doors 8 and 9 are heavy and perform the functions of (1) holding the net down to follow ups and downs of the bottom, (2) spreading the mouth of the net, and (3) stirring up a mud cloud and directing it inward toward the net. As shown in FIG. 1a, the deployment of the net behind the doors is by means of various tackle as described in U.S. Department of Interior Fishery Leaflet 437, December 1956 "Assembly Methods for Otter-Trawl Nets," by Boris O. Knake. Extending back from each door is a ground wire 10 which divides into upper and lower leg wires 11 and 12. Joining the upper leg wires 11 is a "headrope" 13 to which the top or head of the net is tied. Floats 14 are also seized on to the headrope at intervals of about three feet. Joining the lower leg wires along the bottom and somewhat longer than the headrope is a "foot rope" 15. Various means are provided to minimize damage to the heavy "foot rope," the net, and the seizings which secure them, from small obstacles found on the bottom such as stones and shell.

Spheres of glass and spheres and drums of steel have been used for headline floats 14; but generally, now, spheres of aluminum are preferred. The buoyance of the floats, the weight of the foot rope (a steel cable up to an inch in diameter) and other tackle, and the deployment of the otter doors insure that the net is held open.

In accordance with the invention a bathykymograph 20 is fixed in the manner of the floats 14. Since the geometry of the net remains substantially constant, the height of bathykymograph above the bottom also remains substantially constant, so that the hydrostatic pressure at the instrument is a reliable measure of ocean depth.

In the general arrangement view, FIG. 2, the bathykymograph 20 is shown as comprising two hemispheres 21 and 22, a battery pack 24, a tape recorder 25, an oscillator circuit board 27, multivibrator circuit board 28, and a pressure transducer 29.

As shown schematically in FIG. 3, the tape recorder 28 comprises a drive motor 30, a tape transport mechanism 31, and a recording head 32. The oscillator circuit board 27 includes circuits for a variable frequency oscillator 34, the board 28 carries circuits and parts for the multivibrator 35, and gates 36 and 37 for periodically energizing the oscillator 34 and the motor 30. The pressure transducer 29, through a linkage 39 varies the frequency of the oscillator 34 responsive to changes in ambient pressure.

It is preferred that the oscillator 34 have a frequency of about 500 cycles for minimum depth, and a frequency of about 900 cycles for maximum depth. The multivibrator may turn the recorder "on" for about ¼ second every 2½ minutes. During the "on" time the tape reaches normal one-inch-per-second speed in about three milliseconds, and stops in about the same length of time. Gating out the stop-start transient, about 100 cycles are left in a minimum sample, 180 in a maximum sample. At this rate 6 inches of tape are used per hour. Two weeks of operation requires less than 160 feet and one-percent accuracy in counting cycles can readily be achieved.

A pressure sensitive element may affect a change in oscillator frequency in many ways known to the engineer. It is preferred for this high-pressure range to use a bellows type pressure responsive element as produced by Kinemotive Corporation at Farmingdale, N.Y., which varies a potentiometer 40 with a suitable mechanical linkage 39.

Small, stable oscillators which change frequency responsive to input voltage or to resistance change are well known in the art and available in commerce.

Figure 4:
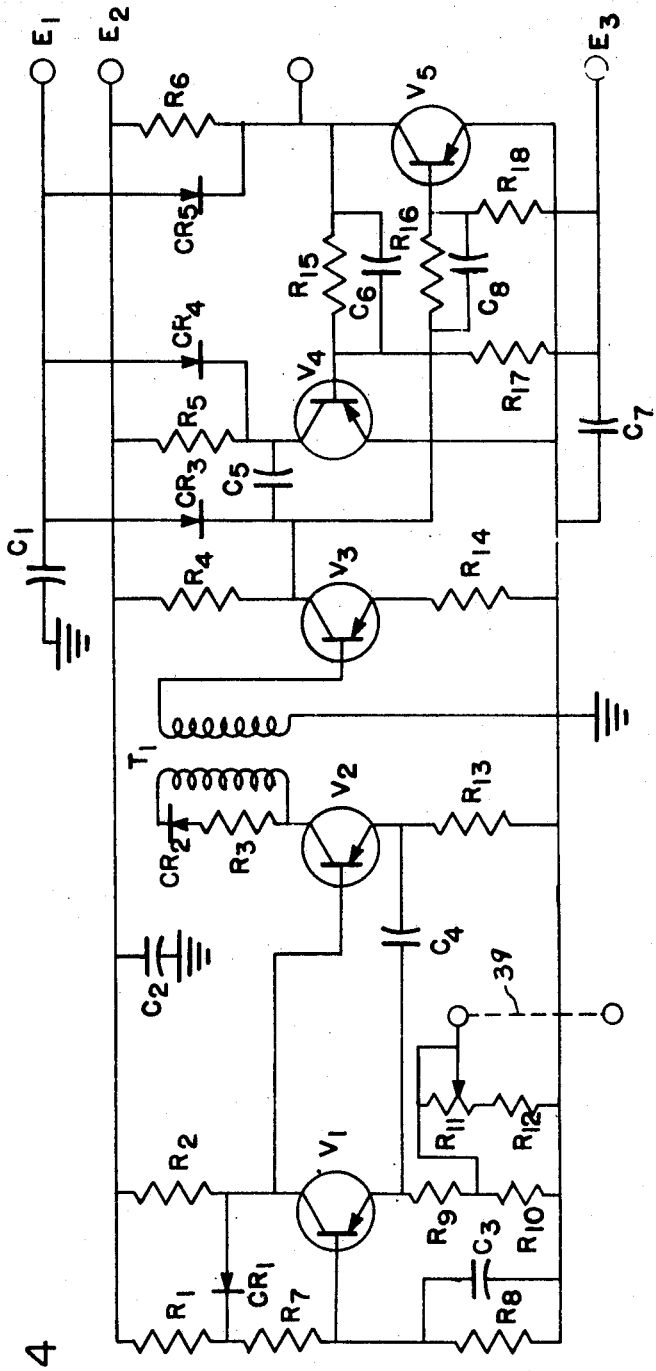
FIG. 4 is a schematic diagram of a variable frequency oscillator for the invention.

The schematic diagram for such an oscillator is shown in FIG. 4 for which preferred circuit values are set forth in Table I.

TABLE I

| | |
|---|---|
| $R_1$—330 | $C_2$—0.1 μf. |
| $R_2$—4.2K | $C_3$—0.001 |
| $R_3$—33 | $C_4$—1.0 |
| $R_4$—1.5K | $C_5$—0.0033 |
| $R_5$—1.5K | $C_6$—56 pf. |
| $R_6$—510 | $C_7$—0.01 |
| $R_7$—1K | $C_8$—120 pf. |
| $R_8$—680 | $CR_2$—IN270 |
| $R_9$—1.0K | $CR_3$—IN270 |
| $R_{10}$—270K | $CR_4$—IN270 |
| $R_{11}$—100K | $CR_5$—IN270 |
| $R_{12}$—1.8K | $V_1$—2N501 |
| $R_{13}$—1.2K | $V_2$—2N393 |
| $R_{14}$—10 | $V_3$—2N393 |
| $R_{15}$—4.7K | $V_4$—2N393 |
| $R_{16}$—1.2K | $V_5$—2N393 |
| $R_{17}$—82K | $E_1$——4 v. |
| $R_{18}$—33K | $E_2$——15 v. |
| $C_1$—0.1 μf. | $E_3$—+10 v. |

Resistances in ohms and (K) thousands of ohms; capacitances in microfarads and (pf.) picofarads. $T_1$ ferrite core pulse transformer.

Transistors $V_1$ and $V_2$ comprise a relaxation oscillator the frequency of which is determined principally by the capacitor $C_4$ and the resistors $R_9$–$R_{12}$ in the emitter circuit of $V_1$. Variation of the resistance $R_{11}$ by linkage to the pressure transducer produces the desired change in frequency. The harmonic-rich output of this portion of the circuit through the transformer $T_1$ is smoothed by the circuits of the transistors $V_3$–$V_5$. A feedback path for high frequencies via capacitor $C_6$, transistor $V_4$ and capacitor $C_5$ gives the amplifier a broad band-pass characteristic; and the diodes $CR_2$–$CR_5$ tend to stabilize the amplitude independent of frequency.

In use the bathykymograph is attached to the net when it is about to be lowered. It starts automatically upon reaching a predetermined depth of water and operates for up to two weeks during which time the trawler ordinarily will make many hauls and return to port. In port, the bathykymographs are picked up by a data processing contractor or other central agency together with information on ship's position from ships logs and instrumentation.

Eachc bathykymograph is opened and the tape read automatically into form for computer input. From the pressure record and the accompanying ship's course information, the contour of the ocean bottom along the tentative track of the ship may be drawn. This track is subject to error because of errors in navigation of the ship and errors in clock rate of the bathykymograph. As tentative records are accumulated from many ships a crisscrossing data pattern is developed. Common points are compared. Records of elaborately instrumented research and military craft are tied in. Gradually complete and detailed relief maps of the bottom will be developed. By matching a ship's track with such a map, extremely accurate position information is developed. With this information on net position additional meaningful measurements may be made in similar manner by magnetometers, and instruments to measure salinity, temperature and other parameters of interest.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The embodiments of this invention in which an exclusive property or privilege is claimed are defined as follows:

1. The method of accumulating oceanographic information and relating it to precise locations comprising the steps of:
    (a) attaching a plurality of bathykymographs to a like plurality of bottom-following fishing nets,
    (b) trawling said nets by a like plurality of ships in the ocean,
    (c) recovering data from said bathykymographs and from said ships' navigational records,
    (d) correlating bathykymograph depth data and ships' position data from each ship to obtain for each said ship a bottom profile for a tentative track, and
    (e) comparing said profiles at common points from said plurality of ships, and from other chart data to create bottom maps of improved accuracy.

2. A bathykymograph comprising a sphere externally configured for attachment as a head-rope float; a timer for demarking alternative sampling times and waiting times; a variable frequency oscillator; a magnetic tape recorder; said recorder including a recording head connected to said oscillator, a tape transport, and a drive motor for intermittently driving said tape past said head; means responsive to said timer to energize said drive motor to drive said tape only during said sampling times; and a transducer linked to said oscillator to vary the frequency of said oscillator in accordance with an oceanographic parameter; and an electric battery to provide energy for said oscillator and said motor; said timer, oscillator, recorder, responsive means, transducer and battery being enclosed within said sphere.

3. Oceanographic apparatus comprising, in combination, a ship; means for determining with small errors the positions of said ship periodically during an operating period; an otter trawl net, having a footrope and a head rope, lines for dragging said net behind said ship; and a float attached to said head rope a predetermined distance from said footrope, said float comprising a pressure measuring instrument; a mechanism for recording measured pressures periodically during said operating period, and a battery for operating said instrument and said mechanism.

References Cited

UNITED STATES PATENTS

| | | | |
|---|---|---|---|
| 2,378,383 | 6/1945 | Arndt | 346—21 X |
| 2,955,467 | 10/1960 | Parkhurst | 73—391 X |
| 3,038,143 | 6/1962 | Dow. | |
| 3,104,928 | 9/1963 | Hester | 73—300 X |
| 3,162,044 | 12/1964 | Lee | 73—300 X |

JERRY W. MYRACLE, Primary Examiner

U.S. Cl. X.R,

73—300, 391; 346—72